(12) United States Patent
Satoji et al.

(10) Patent No.: US 7,625,124 B2
(45) Date of Patent: Dec. 1, 2009

(54) FLUID BEARING DEVICE

(75) Inventors: Fuminori Satoji, Kuwana (JP);
Ryouichi Nakajima, Kuwana (JP);
Kenji Ito, Kuwana (JP)

(73) Assignee: NTN Corporation, Osaka (JP)

( * ) Notice: Subject to any disclaimer, the term of this patent is extended or adjusted under 35 U.S.C. 154(b) by 311 days.

(21) Appl. No.: 10/569,085

(22) PCT Filed: Sep. 1, 2004

(86) PCT No.: PCT/JP2004/013015
§ 371 (c)(1),
(2), (4) Date: Aug. 10, 2006

(87) PCT Pub. No.: WO2005/028892
PCT Pub. Date: Mar. 31, 2005

(65) Prior Publication Data
US 2007/0092170 A1    Apr. 26, 2007

(30) Foreign Application Priority Data
Sep. 18, 2003    (JP) ............... 2003-326231

(51) Int. Cl.
*F16C 32/06* (2006.01)
(52) U.S. Cl. ...................... 384/107; 384/100
(58) Field of Classification Search ........... 384/100, 384/107, 114, 121
See application file for complete search history.

(56) References Cited
U.S. PATENT DOCUMENTS 6,361,214 B1 * 3/2002 Ichiyama .................. 384/107
6,390,681 B1    5/2002 Nakazeki et al.
7,025,505 B2 * 4/2006 Komori et al. ............. 384/107
2003/0091249 A1    5/2003 Kurimura et al.
2008/0107368 A1    5/2008 Kurimura et al.
2008/0187258 A1    8/2008 Kurimura et al.
2008/0212906 A1    9/2008 Kurimura et al.

FOREIGN PATENT DOCUMENTS

| CN | 1419057 | 5/2003 |
|---|---|---|
| JP | 5-003630 | 1/1993 |
| JP | 6-137323 | 5/1994 |
| JP | 10-159854 | 6/1998 |
| JP | 11-042514 | 2/1999 |
| JP | 2000-291648 | 10/2000 |
| JP | 2002-276666 | 9/2002 |
| JP | 2003-239974 | 8/2003 |

OTHER PUBLICATIONS

Chinese Office Action dated Jun. 5, 2009 for Chinese Application No. 200710194373.7 with English translation.

* cited by examiner

*Primary Examiner*—Thomas R Hannon
(74) *Attorney, Agent, or Firm*—Wenderoth, Lind & Ponack, L.L.P.

(57) ABSTRACT

While applying an ultrasonic vibration to a housing 7 and/or a bearing sleeve 8, the outer peripheral surface 8*d* of the bearing sleeve 8 is press-fitted into the inner peripheral surface 7*c* of the housing 7 with a predetermined interference, and is welded thereto. During the press-fitting, the region of the inner peripheral surface 7*c* of the housing 7 coming into contact with the bearing sleeve 8 is melted or softened by the action of the ultrasonic vibration, so that, as compared with a case in which only press-fitting is conducted, the requisite press-fitting force at the time of press-fitting can be substantially reduced.

2 Claims, 5 Drawing Sheets

FLUID BEARING DEVICE

TECHNICAL FIELD

The present invention relates to a fluid bearing device that supports a rotary member in a non-contact manner by an oil film of lubricating oil formed in a radial bearing clearance. The fluid bearing device of the invention is suitably used in spindle motors of information equipment including magnetic discs such as HDDs or FDDs, optical disk devices such as CD-ROM, CD-RW/RW, or DVD-ROM/RAM drives, and optical magnetic disc devices such as MD or MO drives, polygon scanner motors of laser beam printers (LBPs), or other small motors in various electrical equipment such as axial-flow fans.

BACKGROUND ART

The motors mentioned above must satisfy various requirements such as high rotation precision, high speed, low cost, and low noise. Motor spindle bearing is one of the constituent elements that determine required motor performance. Fluid bearings are considered to have excellent characteristics in many respects with regard to the required motor performance and some have found actual applications in recent years.

Fluid bearings of this type are generally classified into two categories. One is the dynamic bearing, which includes means for generating dynamic pressure of lubricating oil in a bearing clearance. The other is the cylindrical bearing (whose bearing surface forms a true circle) which has no such dynamic-pressure generating means.

For example, in a fluid bearing device incorporated in the spindle motor of a disc device, such as an HDD, there are provided a radial bearing portion rotatably supporting a shaft member in a radial direction in a non-contact manner and a thrust bearing portion rotatably supporting the shaft member in a thrust direction. As the radial bearing portion, there is used a dynamic bearing having grooves for dynamic pressure generation (dynamic pressure generating grooves) in the inner peripheral surface of the bearing sleeve or the outer peripheral surface of the shaft member. As the thrust bearing portion, there is used, for example, a dynamic bearing in which dynamic pressure generating grooves are provided in the end surfaces of the flange portion of the shaft member or the surfaces opposed thereto (the end surfaces of the bearing sleeve, the end surfaces of a thrust member fixed to the housing, etc.) (see, for example, Patent Document 1). In some cases, there is used, as a thrust bearing portion, a bearing supporting one end surface of a shaft member by means of a thrust plate in a contact fashion (a so-called pivot bearing) (see, for example, Patent Document 2).

Usually, the bearing sleeve is fixed at a predetermined position of the inner periphery of a housing; further, to prevent lubricating oil filled into the inner space of the housing from leaking to the exterior, a seal member is often arranged at the opening of the housing.

Patent Document 1: JP 2000-291648 A

Patent Document 2: JP 11-191943 A

A fluid bearing device of the above-described construction is composed of components such as a housing, a bearing sleeve, a shaft member, a thrust member, and a seal member; efforts are being made to enhance the working precision and assembly precision of each component in order to ensure a high level of bearing performance required as information apparatuses are improved more and more in terms of performance. At the same time, with the recent trend toward lower-cost information apparatuses, there is an increasing demand for a reduction in cost for such a fluid bearing device.

An important factor in achieving a reduction in cost for such a fluid bearing device is an improvement in the efficiency of the assembly process. In many cases, the bonding between the housing and the bearing sleeve, between the housing and the thrust member, and between the housing and the seal member is effected by an adhesive; it should be noted, however, that it takes a relatively long time for the applied adhesive to be cured, which is one of the reasons for the rather poor efficiency of the assembly process. Further, there is a fear of gas emission from the adhesive and a deterioration of the adhesive with the passage of time.

The above problems might be solved by adopting press-fitting as the fixing means; however, the press-fitting force could lead to a deterioration in dimensional precision of the components, and the sliding of the components on each other at the time of press-fitting could generate abrasion dust (particles).

DISCLOSURE OF THE INVENTION

It is an object of the present invention to achieve a reduction in the production cost for the housing of such a fluid bearing device and to abolish the use of an adhesive for the bonded portions, such as the housing and the bearing sleeve, thereby achieving an improvement in terms of efficiency for the assembly process and providing a still less expensive fluid bearing device.

It is another object of the present invention to provide a fluid bearing device little subject to gas emission from the bonding portions between the components or a deterioration in bonding force with passage of time.

It is still another object of the present invention to provide a fluid bearing device of still higher reliability capable of maintaining a high level of dimensional accuracy for the components and suppressing intrusion of contaminants into the bearing device.

In order to achieve the above objects, according to the present invention, there is provided a fluid bearing device including: a housing; a bearing sleeve arranged in an inside of the housing; a shaft member inserted into an inner peripheral surface of the bearing sleeve; and a radial bearing portion supporting the shaft member in a radial direction in a non-contact manner with an oil film of lubricating oil generated in a radial bearing clearance between the inner peripheral surface of the bearing sleeve and an outer peripheral surface of the shaft member, the device being structured such that the housing is formed of a resin material, and the bearing sleeve is press-fitted into an inner peripheral surface of the housing under the action of an ultrasonic vibration and is welded thereto.

The resin housing can be formed by molding, such as injection molding, so that it can be produced at lower cost as compared with a metal housing formed by machining such as turning; further, it helps to ensure a relatively high level of precision as compared with a metal housing formed by press working.

The bearing sleeve is press-fitted into the inner peripheral surface of the housing under the action of an ultrasonic vibration, that is, while applying an ultrasonic vibration to the housing and/or the bearing sleeve. During the press-fitting, the region of the inner peripheral surface of the housing in contact with the bearing sleeve is melted or softened by the action of the ultrasonic vibration, so that as compared with the case in which only press-fitting is conducted (that is, press-fitting is effected without applying an ultrasonic vibration), it is possible to substantially reduce the requisite press-fitting force. This help store strain fluctuations in the outer diameter of the housing and the inner diameter of the bearing sleeve due to the press-fitting, making it possible to maintain a satisfactory dimensional precision. Further, by reducing the press-fitting force at the time of press-fitting, the generation of abrasion dust in the portion where the housing the bearing sleeve slide on each other is reduced, thus restraining intrusion of contaminant into the bearing device.

The application of the ultrasonic vibration may be continued even after the completion of the bearing sleeve press-fitting operation; however, when, at the time of completion of the press-fitting operation, the inner peripheral surface of the housing has been welded to such a degree as will allow welding, it is possible to stop the application of the ultrasonic vibration upon the completion of the press-fitting operation. In this way, the region of the inner peripheral surface of the housing which is in contact with the bearing sleeve is melted by the action of the ultrasonic vibration to be welded to the bearing sleeve (ultrasonic welding). As compared with the conventional fixation by an adhesive, the operational efficiency can be enhanced, and it is possible to prevent or restrain gas emission from the fixing portion and deterioration in the fixing force with passage of time.

There are no particular limitations regarding the resin forming the housing as long as it is a thermoplastic resin; examples of an amorphous resin that can be adopted include polysulfone (PSU), polyether sulfone (PES), polyphenyl sulfone (PPSU), and polyether imide (PEI). Examples of a crystalline resin that can be adopted include liquid crystal polymer (LCP), polyether ether ketone (PEEK) polybutylene terephthalate (PBT), and polyphenylene sulfide (PPS). It is also possible to mix a filler with these resins. There are no particular limitations regarding the kind of filler. Examples of a filler that can be adopted-include fibrous or powdered conductive fillers; it is possible to use, for example, a fibrous filler, such as glass fiber, a whisker-like filler, such as potassium titanate, a scaly filler, such as mica, carbon fiber, carbon black, graphite, carbon nano-material, or metal powder. When mixing a conductive filler, it is desirable to adopt a carbon nano-material in view of its high conductivity, satisfactory dispersion in resin matrix, high abrasion resistance, low gas emission, etc. As the carbon nano-material, it is desirable to adopt carbon nanofiber. The carbon nanofiber includes what is called "carbon nanotube" with a diameter of not more than 40 to 50 nm.

In a fluid bearing device including: a housing; a bearing sleeve arranged in an inside of the housing; a shaft member inserted into an inner peripheral surface of the bearing sleeve; a radial bearing portion supporting the shaft member in a radial direction in a non-contact manner with an oil film of lubricating oil generated in a radial bearing clearance between the inner peripheral surface of the bearing sleeve and an outer peripheral surface of the shaft member; and a thrust bearing portion supporting the shaft member in a thrust direction, the housing may be formed of the above resin material, while at least one of the bearing sleeve and a thrust member constituting the thrust bearing portion may be press-fitted into an inner peripheral surface of the housing under the action of an ultrasonic vibration and is welded thereto.

Further, in a fluid bearing device including: a housing; a bearing sleeve arranged in an inside of the housing; a shaft member inserted into an inner peripheral surface of the bearing sleeve; a radial bearing portion supporting the shaft member in a radial direction in a non-contact manner with an oil film of lubricating oil generated in a radial bearing clearance between the inner peripheral surface of the bearing sleeve and an outer peripheral surface of the shaft member; and a seal portion sealing up the interior of the housing, the housing may be formed of the above resin material, while at least one of the bearing sleeve and a seal member constituting the seal portion may be press-fitted into an inner peripheral surface of the housing under the action of an ultrasonic vibration and is welded thereto.

According to the present invention, the production cost for the housing is reduced, and the use of an adhesive in the portions where the housing and the bearing sleeve, etc. are bonded together can be abolished, thereby achieving an improvement in terms of the efficiency of the assembly process and providing a still less expensive fluid bearing device.

Further, according to the present invention, there is little involved gas emission from the portions where the components are fixed together or deterioration in fixing force with passage of time, thus making it possible to provide a fluid bearing device superior in quality and durability.

Furthermore, according to the present invention, it is possible to provide a fluid bearing device of a still higher reliability in which the requisite dimensional accuracy for the components is maintained and in which intrusion of contaminant into the device is restrained.

BRIEF DESCRIPTION OF THE DRAWINGS

FIG. 4 shows a bearing sleeve, of which

BEST MODE FOR CARRYING OUT THE INVENTION

Embodiments of the present invention will be hereinafter described.

Figure 1:
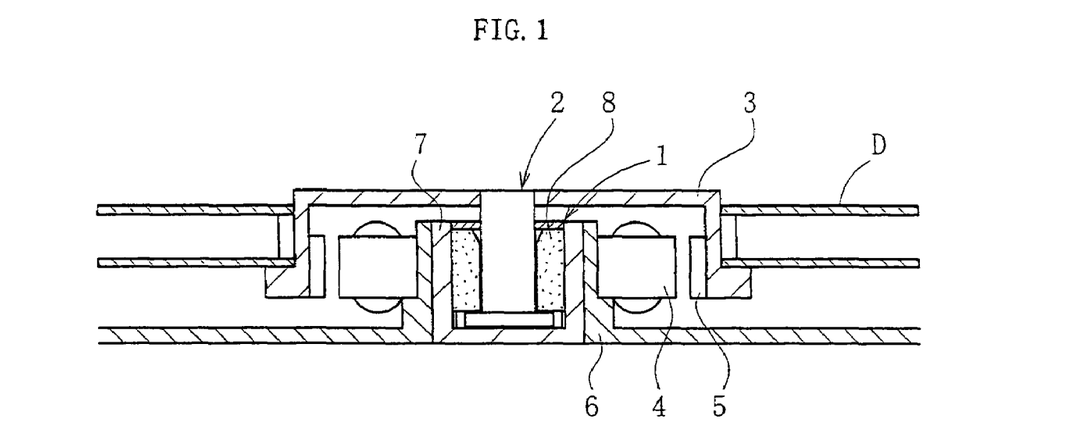
FIG. 1 is a sectional view of a spindle motor for an information apparatus into which a dynamic bearing device according to an embodiment of the present invention is incorporated.

FIG. 1 schematically shows an example of a construction of a spindle motor for an information apparatus into which a fluid bearing device (fluid dynamic bearing device) 1 according to this embodiment is incorporated. The spindle motor is used for a disk drive device such as an HDD, and includes the dynamic bearing device 1 for rotatably supporting a shaft member 2 in a non-contact manner, a rotor (disk hub) 3 attached to the shaft member 2, a stator 4, and a rotor magnet 5 radially opposite the stator 4 with a gap therebetween, for example. The stator 4 is mounted on the outer periphery of a bracket 6, while the rotor magnet 5 is mounted to the inner periphery of the disk hub 3. The housing 7 of the dynamic bearing device 1 is attached to the inner periphery of the bracket 6. The disk hub 3 is for holding one or a plurality of disks D such as magnetic disks. Energizing the stator 4 rotates the rotor magnet 5 by the electromagnetic force therebetween, thereby rotating the disk hub 3 and the shaft member 2 integrally.

Figure 2:
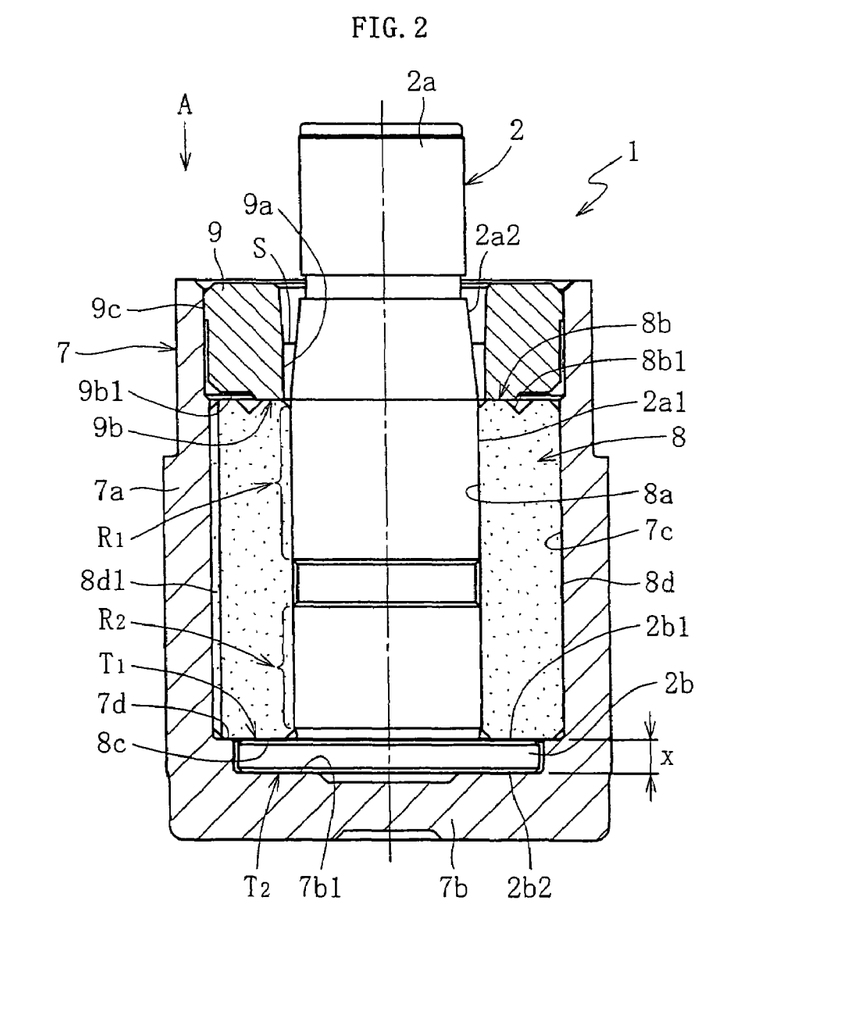
FIG. 2 is a sectional view of a dynamic bearing device according to an embodiment of the present invention.

FIG. 2 shows the dynamic bearing device 1. The dynamic bearing device 1 is generally configured with the structural parts including the housing 7, a bearing sleeve 8 and a sealing material 9 fixed to the housing 7, and the shaft member 2.

Between an inner peripheral surface 8a of the bearing sleeve 8 and an outer peripheral surface 2a1 of the shaft member 2, there are provided a first radial bearing portion R1 and a second radial bearing portion R2 so as to be axially spaced apart from each other. Further, between a lower end surface 8c of the bearing sleeve 8 and an upper end surface 2b1 of the shaft member 2, there is provided a first thrust bearing portion T1, and, between an inner bottom surface 7b1 of a bottom portion 7b of the housing 7 and a lower end surface 2b2 of a flange portion 2b, there is provided a second thrust bearing portion T2. For the sake of convenience, the bottom portion 7b side of the housing 7 will be referred to as the lower side, and the side opposite to the bottom portion 7b will be referred to as the upper side.

Figure 3:
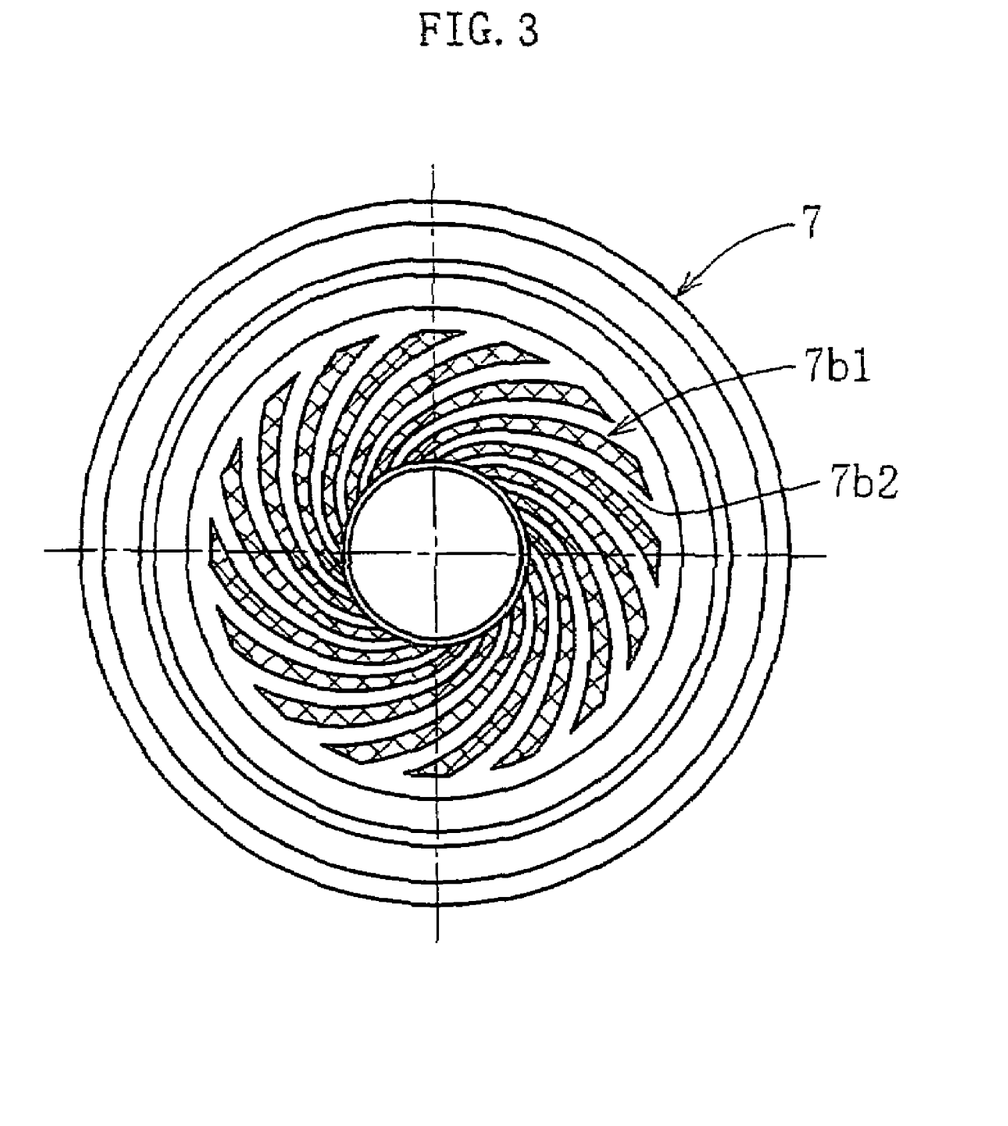
FIG. 3 is a view of a housing as seen from the direction of an arrow A of FIG. 2.

The housing 7 is formed as a bottomed cylinder by injection molding using a resin material consisting of liquid crystal polymer (LCP) as the crystalline resin and 2 to 8 wt % of carbon nanotube as the conductive filler, and is equipped with a cylindrical side portion 7a and the bottom portion 7b integrally provided at the lower end of the side portion 7a. As shown in FIG. 3, dynamic pressure generating grooves 7b2 of, for example, a spiral configuration, are formed in the inner bottom surface 7b1 of the bottom portion 7b constituting the thrust bearing surface of the second thrust bearing portion T2. The dynamic pressure generating grooves 7b2 are formed at the time of injection molding of the housing 7. That is, a groove pattern for forming the dynamic pressure generating grooves 7b2 is provided beforehand at a desired position (the position where the inner bottom surface 7b1 is to be formed) of the mold for molding the housing 7, and, at the time of injection molding of the housing 7, the shape of the groove pattern is transferred to the inner bottom surface 7b1 of the housing 7, whereby it is possible to form the dynamic pressure generating grooves 7b2 simultaneously with the formation of the housing 7. Further, a step portion 7d is formed integrally at a position above the inner bottom surface (the thrust bearing surface) 7b1 and axially spaced apart therefrom by a predetermined dimension x.

The shaft member 2 is formed, for example, of a metal material, such as stainless steel, and is equipped with the shaft portion 2a and the flange portion 2b provided integrally or separately at the lower end of the shaft portion 2a.

The bearing sleeve 8 is formed in a cylindrical configuration using, for example, a porous material made of a sintered metal, in particular, a porous material made of a sintered metal whose main component is copper, and is secured at a predetermined position of the inner peripheral surface 7c of the housing 7.

Figure 4A:
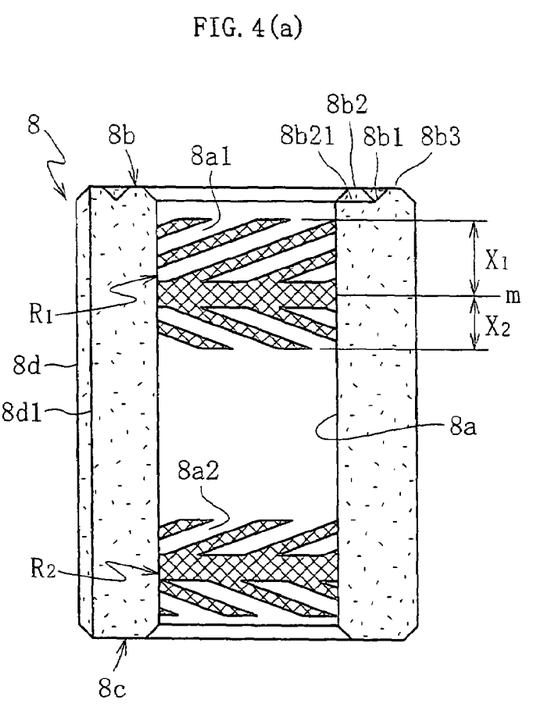
FIG. 4(a) is a sectional view.

In the inner peripheral surface 8a of this bearing sleeve 8, formed of a sintered metal, there are formed upper and lower areas axially spaced apart from each other and constituting the radial bearing surfaces of the first radial bearing portion R1 and the second radial bearing portion R2, and, in these two areas, there are respectively formed, for example, herringbone-shaped dynamic pressure generating grooves 8a1 and 8a2 as shown in FIG. 4(a). The upper dynamic pressure generating grooves 8a1 are formed asymmetrically in the axial direction with respect to an axial center m (the axial center between the upper and lower inclined groove regions), with an axial dimension X1 of the region above the axial center m being larger than an axial dimension X2 of the region below the axial center m. Further, in an outer peripheral surface 8d of the bearing sleeve 8, there is formed one or a plurality of axial grooves 8d1 so as to extend over the entire axial length of the sleeve. In this example, three axial grooves 8d1 are formed at equal circumferential intervals.

Figure 4B:
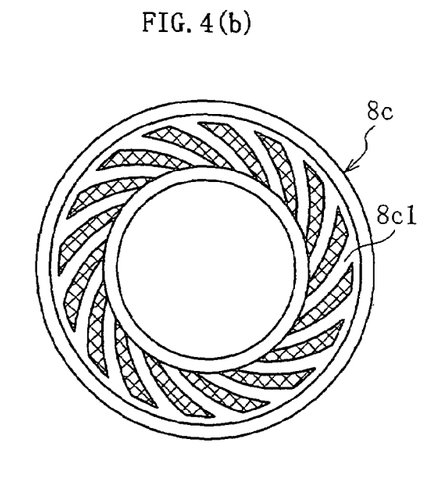
FIG. 4(b) is a view of a lower end surface.

In the lower end surface 8c of the bearing sleeve 8 constituting the thrust bearing surface of the first thrust bearing portion T1, there are formed, for example, spiral dynamic pressure generating grooves 8c1 as shown in FIG. 4(b).

Figure 4C:
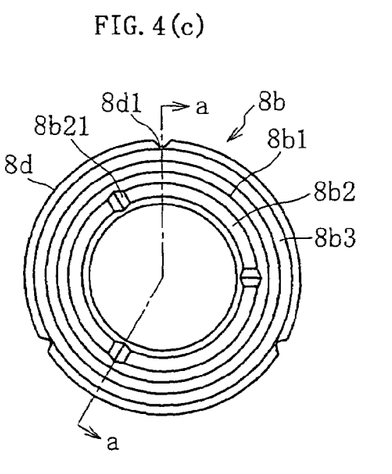
FIG. 4(c) is a view of an upper end surface.

As shown in FIG. 4(c), the upper end surface 8b of the bearing sleeve 8 is separated into an inner area 8b2 and an outer area 8b3 by a circumferential groove 8b1 provided substantially at the center in the radial direction, with one or a plurality of radial grooves 8b21 being formed in the inner area 8b2. In this example, three radial grooves 8b21 are formed at equal circumferential intervals.

The seal member 9 is fixed, for example, to the inner periphery of the upper end portion of the side portion 7a of the housing 7, and the inner peripheral surface 9a thereof is opposed to a tapered surface 2a2 provided in the outer periphery of the shaft portion 2a through the intermediation of a space S. The tapered surface 2a2 of the shaft portion 2a gradually decreases in diameter as it extends upwards (outwardly with respect to the housing 7), and also functions as a centrifugal seal through rotation of the shaft member 2. Further, the outer area 9b1 of the lower end surface 9a of the seal member 9 is slightly larger in diameter than the inner area thereof.

The dynamic bearing device 1 of this embodiment is assembled, for example, by the following steps.

First, the shaft member 2 is assembled into the bearing sleeve 8. Then, while imparting an ultrasonic vibration to the housing 7 and/or the bearing sleeve 8, the outer peripheral surface 8d of the bearing sleeve 8 is press-fitted into the inner peripheral surface 7c of the housing 7 with a predetermined interference. During the press-fitting, the region of the inner peripheral surface 7c of the housing 7 coming into contact with the bearing sleeve 8 is melted or softened by the action of the ultrasonic vibration, so that, as compared with the case in which only press-fitting is conducted (i.e., the case in which press-fitting is conducted without any ultrasonic vibration), the requisite press-fitting force at the time of press-fitting can be substantially reduced. The bearing sleeve 8 is press-fitted until the lower end surface 8c thereof a buts against the step portion 7d of the housing 7. By causing the lower end surface 8c of the bearing sleeve 8 to abut against the step portion 7d of the housing 7, it is possible to correctly determine the axial position of the bearing sleeve 8 with respect to the housing 7. Then, even after the completion of the operation of press-fitting the bearing sleeve 8, the application of an ultrasonic vibration is continued, or, when, upon completion of the press-fitting operation, the inner peripheral surface of the housing 7 has been melted to such a degree as will allow welding, the application of an ultrasonic vibration is stopped, and the outer peripheral surface 8d of the bearing sleeve 8 is welded to the inner peripheral surface 7c of the housing 7 (ultrasonic welding).

Figure 6:
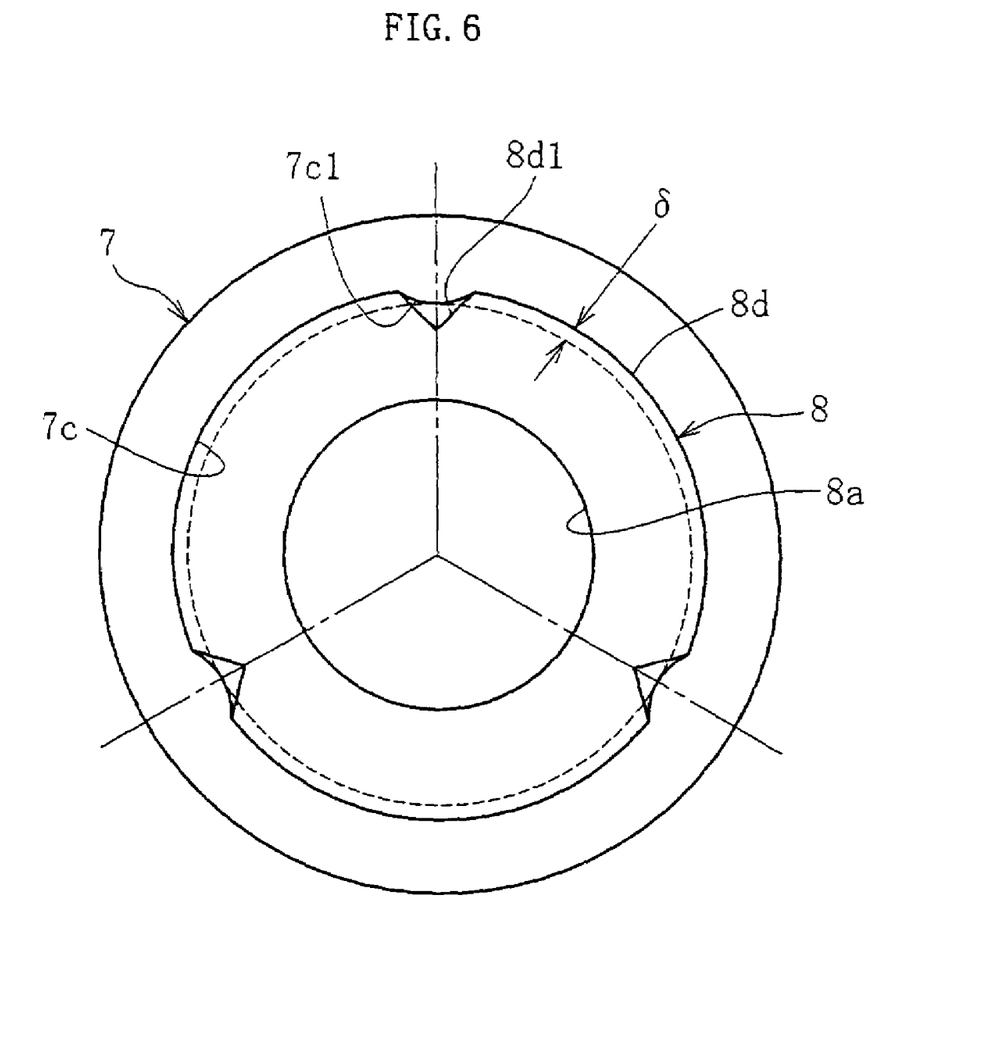
FIG. 6 is a cross-sectional view of the housing and the bearing sleeve after press-fitting and welding.

FIG. 6 is a cross-sectional view of the housing 7 and the bearing sleeve 8 after the press-fitting and welding. The inner peripheral surface 7c of the housing is firmly attached to the outer peripheral surface 8d of the bearing sleeve 8 by press-fitting and welding. The bearing sleeve 8 is formed of a porous sintered metal, so that, at the time of welding, the molten resin of the inner peripheral surface 7c of the housing 7 enters inner pores of the bearing sleeve 8 through surface openings of the outer peripheral surface 8d thereof (the surface openings are portions where the inner pores of the porous texture of the sintered metal are open to the surface), and solidifies therein. Then, the resin portion solidified in the inner pores causes the housing 7 and the bearing sleeve 8 to firmly cling to each other by a kind of anchor effect, so that relative positional deviation between them does not easily occur. Further, at positions opposed to the axial grooves 8d1 of the bearing sleeve 8, part of the inner peripheral surface 7c of the housing 7 radially protrudes in the form of rib-like portions 7c1, which are engaged with the axial grooves 8d1 in the rotating direction, whereby positional deviation in the rotating direction between the housing 7 and the bearing sleeve 8 is less likely to occur.

An interference (initial value) δ between the inner peripheral surface 7c of the housing 7 and the outer peripheral surface 8d of the bearing sleeve 8 is set, for example, as follows: 2δ=20 to 30 μm. The value of this interference δ is set such that even when the housing 7 and the bearing sleeve 8 undergo thermal expansion with an increase in the temperature at which the bearing device is used (The thermal expansion amount of the housing 7, formed of resin, is larger than that of the bearing sleeve 8), an interference of approximately 10 μm in diameter will be remained. The interference (initial value) δ after the press-fitting and welding is equal to the press-fitting margin at the time of press-fitting, and all or part of the interference (initial value) δ is the welding margin. The amount by which the rib-like portions 7c1 protrude radially inwards is substantially equal to the interference (initial value) δ, which is a slight amount, so that even in the state in which the rib-like portions 7c1 have been formed, the requisite cross-sectional area of the axial grooves 8d1 is maintained.

Next, the seal member 9 is fixed to the inner periphery of the upper end portion of the side portion 7a of the housing 7 by, for example, means similar to that used in the fixation of the bearing sleeve 8. In this state, the inner area of the lower end surface 9b of the seal member 9 is in contact with the inner area 8b2 of the upper end surface 8b of the bearing sleeve 8.

When the assembly has been completed in the manner as described above, the shaft portion 2a of the shaft member 2 is inserted into the inner peripheral surface 8a of the bearing sleeve 8, and the flange portion 2b is accommodated in the space between the lower end surface 8c of the bearing sleeve 8 and the inner bottom surface 7b1 of the housing 7. Thereafter, the inner space of the housing 7, sealed up by the seal member 9, is filled with a lubricating oil inclusive of the inner pores of the bearing sleeve 8. The oil surface level of the lubricating oil is maintained within the range of the seal space S.

During rotation of the shaft member 2, the areas of the inner peripheral surface 8a of the bearing sleeve 8 constituting the radial bearing surfaces (the upper and lower areas) are opposed to the outer peripheral surface 2a1 of the shaft portion 2a through the intermediation of a radial bearing clearance. Further, the area of the lower end surface 8c of the bearing sleeve 8 constituting the thrust bearing surface is opposed to the upper end surface 2b1 of the flange portion 2b through the intermediation of a thrust bearing clearance, and the area of the inner bottom surface 7b1 of the housing 7 constituting the thrust bearing surface is opposed to the lower end surface 2b2 of the flange portion 2b through the intermediation of a thrust bearing clearance. Then, as the shaft member 2 rotates, dynamic pressure of the lubricating oil is generated in the radial bearing clearances, so that the shaft portion 2a of the shaft member 2 is rotatably supported in a radial direction in a non-contact manner with an oil film of lubricating oil formed in the radial bearing clearances, whereby there are formed the first radial bearing portion R1 and the second radial bearing portion R2 rotatably supporting the shaft member 2 in a radial direction in a non-contact manner. At the same time, dynamic pressure of the lubricating oil is generated in the thrust bearing clearances, so that the flange portion 2b of the shaft member 2 is rotatably supported in both thrust directions in a non-contact manner with an oil film of lubricating oil formed in the thrust bearing clearances. As a result, there are formed the first thrust bearing portion T1 and the second thrust bearing portion T2 rotatably supporting the shaft member 2 in the thrust directions in a non-contact manner. The thrust bearing clearance of the first thrust bearing portion T1 (indicated by symbol δ1) and the second thrust bearing portion T2 (indicated by symbol δ2) can be controlled with high accuracy by the axial dimension x from the inner bottom surface 7b1 to the step portion 7d of the housing 7 and the axial dimension (indicated by symbol w) of the flange portion 2b of the shaft member 2 by establishing the following relationship: x−w=δ1+δ2.

As stated above, the dynamic pressure generating grooves 8a1 of the first radial bearing portion R1 are formed asymmetrically in the axial direction with respect to the axial center m, with the axial dimension X1 of the area above the axial center m being larger than the axial dimension X2 of the area below the axial center m {FIG. 4(a)}. Thus, during rotation of the shaft member 2, the lubricating oil drawing-in force (pumping force) due to the dynamic pressure generating grooves 8a1 is relatively larger in the upper area than in the lower area. Further, due to this difference in drawing-in force, the lubricating oil filling the clearance between the inner peripheral surface 8a of the bearing sleeve 8 and the outer peripheral surface 2a1 of the shaft portion 2a flows downwards, and circulates through the following route: the thrust bearing clearance of the first thrust bearing portion T1→the axial grooves 8d1→the annular clearance between the outer area 9b1 of the lower end surface 9b of the seal member 9 and the outer area 8b3 of the upper end surface 8b of the bearing sleeve 8→the circumferential groove 8b1 of the upper end surface 8b of the bearing sleeve 8→the radial grooves Bb21 of the upper end surface 8b of the bearing sleeve 8, before being drawn again into the radial bearing clearance of the first radial bearing portion R1. In this way, the lubricating oil is caused to circulate through the inner space of the housing 7, whereby it is possible to prevent a phenomenon in which the pressure of the lubricating oil in the inner space becomes locally negative, thereby eliminating the problems such as generation of bubbles due to negative pressure generation, lubricating oil leakage due to bubble generation, and generation of vibrations. Further, even if bubbles are allowed to get mixed with the lubricating oil for some reason or other, the bubbles are discharged into the atmosphere from the oil surface (gas-liquid interface) of the lubricating oil in the seal space S as the bubbles circulate with the lubricating oil, so that it is possible to prevent the adverse effect due to the bubbles more effectively.

Figure 5:
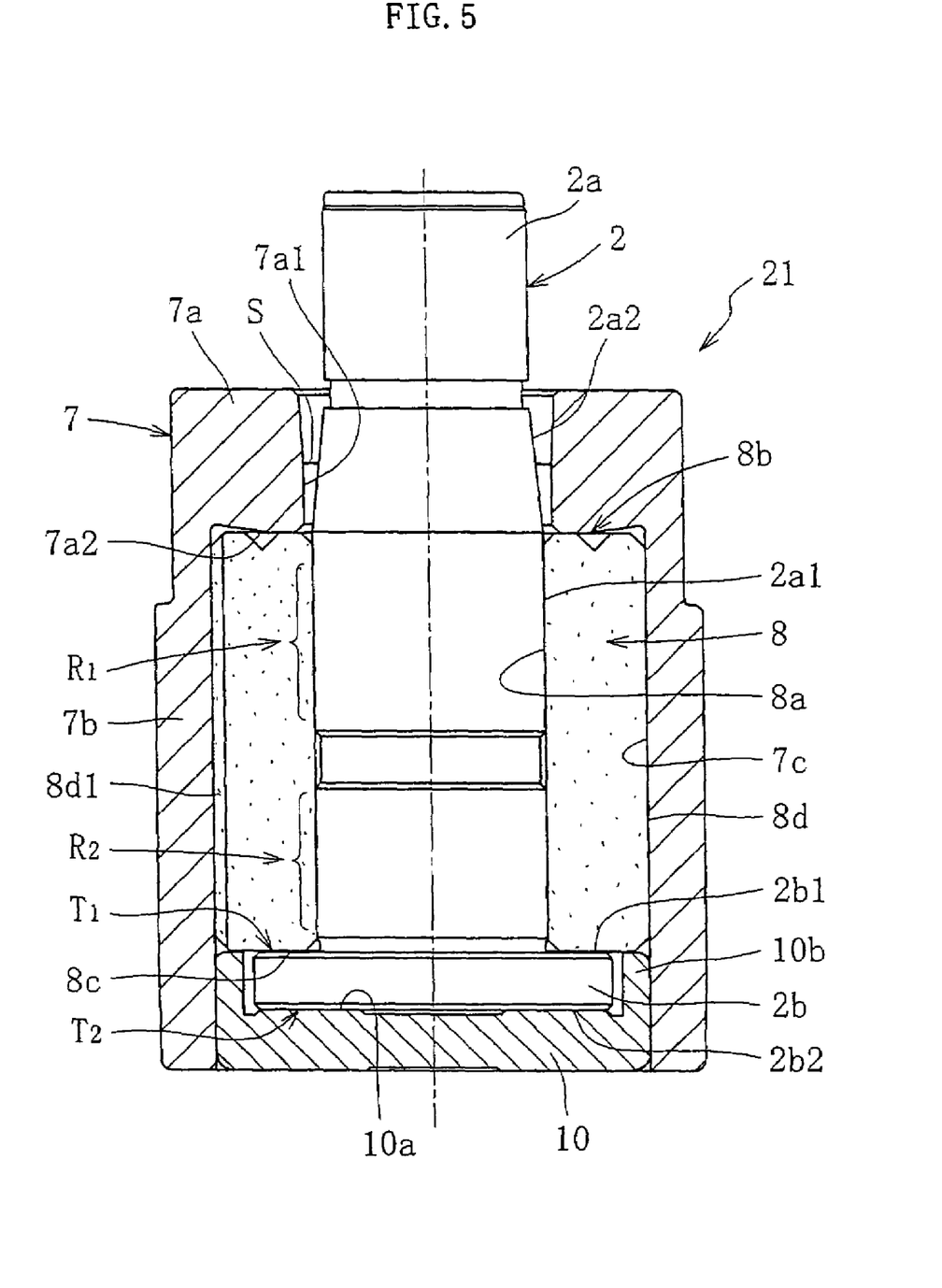
FIG. 5 is a sectional view of the dynamic bearing device according to another embodiment of the present invention.

FIG. 5 shows a fluid bearing device 21 according to another embodiment. This fluid bearing device 21 substantially differs from the fluid bearing device 1 shown in FIG. 2 in that a seal portion 7a is formed integrally with the housing 7 and that the bottom portion of the housing 7 is formed by a separate thrust member 10.

The seal portion 7a extends integrally from the upper end of the cylindrical side portion 7b radially and inwardly, and its inner peripheral surface 7a1 is opposed to a tapered surface 2a2 provided in the outer periphery of the shaft portion 2a through the intermediation of a predetermined seal space S.

The thrust member 10 is formed, for example, of a resin material or a metal material, such as brass, and is fixed to the lower end portion of the inner peripheral surface of the housing 7. In the end surface 10a of the thrust member 10, there are formed dynamic pressure generating grooves similar to the dynamic pressure generating grooves 7b2 shown in FIG. 3. Further, in this embodiment, the thrust member 10 is integrally equipped with an annular abutment portion 10b extending upwardly from the outer peripheral edge portion of the end surface 10a. The upper end surface of the abutment portion 10b abuts against the lower end surface 8c of the bearing sleeve 8, and the inner peripheral surface of the abutment portion 10b is opposed to the outer peripheral surface of the flange portion 2b through the intermediation of a clearance.

The fluid bearing device 1 of this embodiment is assembled, for example, by the following process.

First, as in the above-described embodiment, while imparting an ultrasonic vibration to the housing 7 and/or bearing sleeve 8, the outer peripheral surface 8d of the bearing sleeve 8 is press-fitted into the inner peripheral surface 7c of the housing 7 with a predetermined interference, and welded thereto. The bearing sleeve 8 is press-fitted until a position where the upper end surface 8b thereof abuts against the inner side surface 7a2 of the seal portion 7a. By causing the upper end surface 8b of the bearing sleeve 8 to abut against the inner side surface 7a2 of the seal portion 7a, it is possible to accurately determine the axial position of the bearing sleeve 8 with respect to the housing 7.

Next, the shaft member 2 is assembled into the bearing sleeve 8, and then the thrust member 10 thereof is fixed to the lower end portion of the inner peripheral surface 7c of the housing 7 by, for example, means similar to that as used for the bearing sleeve 8 of the above-described embodiment. In this state, the upper end surface of the abutment portion 10b of the thrust member 10 abuts against the lower end surface 8c of the bearing sleeve 8. This makes it possible to accurately determine the axial position of the thrust member 10 with respect to the bearing sleeve 8. Thus, by controlling the axial dimensions of the abutment portion 10b and the flange portion 2b, it is possible to set with high accuracy the thrust bearing clearances of the first thrust bearing portion T1 and the second thrust bearing portion T2.

When the assembly has been thus completed, the shaft portion 2a of the shaft member 2 is inserted into the inner peripheral surface 8a of the bearing sleeve 8, and the flange portion 2b is accommodated in the space between the lower end surface 8c of the bearing sleeve 8 and the end surface 10a of the thrust member 10. Thereafter, the inner space of the housing 7 sealed up by the seal portion 7a, inclusive of the inner pores of the bearing sleeve 8, is filled with a lubricating oil. The oil surface level of the lubricating oil is maintained within the range of the seal space S.

Otherwise, this embodiment is the same as the above-described one, so that a redundant description thereof will be omitted.

The present invention is also applicable to a fluid bearing device using a so-called pivot bearing as the thrust bearing portion and to a fluid bearing device using a so-called a cylindrical bearing as the radial bearing portion.

EXAMPLES

Measurement in terms of the inner diameter contraction of the bearing sleeve 8, the particle generation amount, and the press-fitting force was conducted on an example in which the bearing sleeve 8 is fixed to the inner peripheral surface 7c of the housing 7 in the manner as described above ("ultrasonic waves+press-fitting"), a comparative example in which the bearing sleeve 8 is fixed to the inner peripheral surface 7c of the housing 7 by an adhesive ("adhesion"), and a comparative example in which the bearing sleeve 8 is fixed to the inner peripheral surface 7c of the housing 7 by press-fitting only ("press-fitting").

TABLE 1

| | Bearing sleeve inner diameter | | |
|---|---|---|---|
| Fixing method | Before fixation | After fixation | Inner diameter contraction |
| Ultrasonic waves + Press-fitting | φ3.99577 | φ3.99523 | 0.00054 |
| Adhesion | φ3.99542 | φ3.99487 | 0.00055 |
| Press-fitting | φ3.99577 | φ3.99520 | 0.00057 |

TABLE 2

| | Number of particles | | | | |
|---|---|---|---|---|---|
| Fixing method | 2 μm or more | 3 μm or more | 5 μm or more | 10 μm or more | 15 μm or more |
| Ultrasonic waves + Press-fitting | 10 | 6 | 3 | 1 | 0 |
| Press-fitting | 12 | 6 | 4 | 3 | 1 |
| Adhesion | 12 | 7 | 3 | 0 | 0 |

TABLE 3

| Fixing method | Press-fitting force (N) |
|---|---|
| Ultrasonic waves + Press-fitting | 30 |
| Press-fitting | 143 |

[Contraction Amount of the Inner Diameter]

As shown in Table 1, in the example ("ultrasonic waves+press-fitting"), the contraction amount of the inner diameter of the bearing sleeve 8 was approximately as small as that in the comparative example ("adhesion"), making it possible to maintain a satisfactory dimensional accuracy for the bearing sleeve 8 also after the fixation.

[Particle Generation Amount]

As shown in Table 2, in the comparative example ("press-fitting"), particles of large grain size were to be observed, while, in the example ("ultrasonic waves+press-fitting"), a satisfactory result was obtained as in the case of the comparative example ("adhesion").

[Press-Fitting Force]

As shown in Table 3, in the example ("ultrasonic waves+press-fitting"), the press-fitting force could be reduced to approximately ⅕ as compared with the comparative example ("press-fitting").

The invention claimed is:

1. A fluid bearing device comprising:
    a housing formed of a resin material and filled with a lubricating oil;
    a bearing sleeve arranged inside the housing and having a radial bearing portion and an axial groove formed in an outer peripheral surface of the bearing sleeve for circulating the lubricating oil;
    a shaft member inserted into an inner peripheral surface of the bearing sleeve with the radial bearing portion supporting the shaft member in a radial direction with the lubricating oil located in a radial bearing clearance between the inner peripheral surface of the bearing sleeve and an outer peripheral surface of the shaft member; and a seal member sealing the housing filled with the lubricating oil, wherein an inner peripheral surface of the housing has a protruding part that protrudes radially inward at a position opposed to the axial groove of the bearing sleeve such that the axial groove and the protruding part of the inner peripheral surface of the housing are engaged in a rotating direction, and the bearing sleeve is press-fitted into the inner peripheral surface of the housing using ultrasonic vibration and welded thereto.

2. A fluid bearing device comprising:

a housing formed of a resin material and filled with a lubricating oil;

a bearing sleeve arranged inside the housing and having a radial bearing portion;

a shaft member, having a shaft portion and a flange portion, inserted into an inner peripheral surface of the bearing sleeve with the radial bearing portion supporting the shaft member in a radial direction with the lubricating oil in a radial bearing clearance between the inner peripheral surface of the bearing sleeve and an outer peripheral surface of the shaft portion of the shaft member;

a thrust member, fixed to the housing, having an annular abutment portion extending axially from an end surface of the thrust member and accommodating the flange portion inside an inner peripheral surface of the abutment portion adjacent to an end surface of the bearing sleeve;

a first thrust bearing portion that supports the shaft member in a thrust direction with the lubricating oil in a thrust bearing clearance between an end surface of the bearing sleeve and an adjacent end surface of the flange portion; and a second thrust bearing portion that supports the shaft member in a thrust direction with the lubricating oil in a thrust bearing clearance between an end surface of the thrust member and an adjacent end surface of the flange member, wherein at least one of the bearing sleeve and the thrust member is press-fitted into an inner peripheral surface of the housing using ultrasonic vibration and welded thereto.

* * * * *